United States Patent
Arumugam (10) Patent No.: US 11,441,886 B2
(45) Date of Patent: Sep. 13, 2022

(54) WIRELESS MEASUREMENT OF LINEAR AND ANGULAR VELOCITY AND ACCELERATION, AND POSITION, RANGE, AND ORIENTATION, VIA WEAKLY-COUPLED QUASISTATIC MAGNETIC FIELDS

(71) Applicant: California Institute of Technology, Pasadena, CA (US)

(72) Inventor: Darmindra D. Arumugam, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 947 days.

(21) Appl. No.: 16/215,546

(22) Filed: Dec. 10, 2018

(65) Prior Publication Data

US 2019/0178622 A1    Jun. 13, 2019

Related U.S. Application Data

(60) Provisional application No. 62/597,102, filed on Dec. 11, 2017.

(51) Int. Cl.
*G01B 7/14* (2006.01)
*G01B 7/30* (2006.01)
(Continued)

(52) U.S. Cl.
CPC ................ *G01B 7/14* (2013.01); *G01B 7/30* (2013.01); *G01C 21/165* (2013.01); *G01P 3/44* (2013.01);
(Continued)

(58) Field of Classification Search
CPC .......... G01B 7/14; G01B 7/30; G01C 21/165; G01P 3/44; G01P 3/50; G01P 15/105; G01S 5/0205; G01S 5/0247; G01S 5/12
See application file for complete search history.

(56) References Cited

U.S. PATENT DOCUMENTS

| 4,314,251 A | 2/1982 | Raab |
| 6,249,680 B1 | 6/2001 | Wax et al. |

(Continued)

FOREIGN PATENT DOCUMENTS

| CA | 3085334 A1 | 6/2019 |
| JP | 5191975 B2 | 5/2013 |

(Continued)

OTHER PUBLICATIONS

Analog Devices. ADIS 16497 downloaded online from<http://www.analog.com/en/products/mems/inertial-measurment-units/adis16497.html.published2017. 39 Pages.

(Continued)

*Primary Examiner* — Elias Desta
(74) *Attorney, Agent, or Firm* — Steinfl + Bruno, LLP (57) ABSTRACT

Range and orientation of a transmitter and a receiver are found by detecting the magnetoquasistatic field couplings between coils at the transmitter and receiver. Sum functions and ratio functions are calculated for each of the unique magnetoquasistatic field couplings between the transmitter and the receiver. The sum and ratio functions are inverted to determine the drift-free range and orientation. Linear and angular velocity and acceleration are calculated by applying a filter to reduce noise, and then taking the corresponding derivatives.

15 Claims, 6 Drawing Sheets

(51) Int. Cl.

| | |
|---|---|
| *G01P 3/50* | (2006.01) |
| *G01P 3/44* | (2006.01) |
| *G01S 5/02* | (2010.01) |
| *G01C 21/16* | (2006.01) |
| *G01S 5/12* | (2006.01) |
| *G01P 15/105* | (2006.01) |

(52) U.S. Cl.
CPC .............. *G01P 3/50* (2013.01); *G01S 5/0205* (2013.01); *G01S 5/0247* (2013.01); *G01S 5/12* (2013.01); *G01P 15/105* (2013.01)

(56) References Cited

U.S. PATENT DOCUMENTS

| | | |
|---|---|---|
| 6,703,829 B2 | 3/2004 | Tola |
| 6,757,557 B1 | 6/2004 | Bladen et al. |
| 6,789,043 B1 | 9/2004 | Nelson et al. |
| 7,289,913 B2 | 10/2007 | Schlicker et al. |
| 7,423,553 B2* | 9/2008 | Yokokohji ............. G02B 27/01 702/104 |
| 7,844,415 B1* | 11/2010 | Bryant ................... G01C 17/02 73/488 |
| 8,723,509 B2 | 5/2014 | Patterson, III et al. |
| 9,451,339 B2 | 9/2016 | Kauffman et al. |
| 9,638,521 B2 | 5/2017 | Arumugam |
| 10,244,421 B2* | 3/2019 | Rawlins ............ H04W 28/0221 |
| 10,352,680 B2 | 7/2019 | Arumugam |
| 10,697,752 B2 | 6/2020 | Arumugam |
| 11,313,892 B2 | 4/2022 | Arumugam |
| 2002/0158626 A1 | 10/2002 | Shay et al. |
| 2004/0021461 A1 | 2/2004 | Goldfine et al. |
| 2006/0267833 A1 | 11/2006 | Langford et al. |
| 2011/0316529 A1 | 12/2011 | Stancil et al. |
| 2013/0002275 A1 | 1/2013 | Min et al. |
| 2014/0266164 A1 | 9/2014 | Arumugam et al. |
| 2016/0097656 A1 | 4/2016 | Arumugam |
| 2017/0067941 A1 | 3/2017 | Hegedus |
| 2017/0131080 A1 | 5/2017 | Arumugam et al. |
| 2018/0287262 A1 | 10/2018 | Patri et al. |
| 2019/0130630 A1 | 5/2019 | Ackerson et al. |
| 2019/0178622 A1 | 6/2019 | Arumugam |
| 2020/0088506 A1 | 3/2020 | Arumugam |
| 2021/0041245 A1 | 2/2021 | Arumugam |
| 2021/0132131 A1 | 5/2021 | Arumugam |

FOREIGN PATENT DOCUMENTS

| | | |
|---|---|---|
| WO | 93/11426 A1 | 6/1993 |
| WO | 2018/191428 A1 | 10/2018 |
| WO | 2019/118373 A1 | 6/2019 |

OTHER PUBLICATIONS

Anderssen, R.S. et al., "Numerical Differentiation Procedures for Non-Exact Data",*Numerische Mathematik*, 22(3), pp. 157-182,Jan. 1972. 17 Pages.

Arumugam, D.D. et al., "Decoupled Range and Orientation Sensing in Long-Range Magnetoquasistatic Positioning",*IEEE Antennas and Wireless Propagation Letters*, 14, pp. 654-657,2015. 4 Pages.

Arumugam, D.D., "Single-Anchor 2-D Magnetoquasistatic Position Sensing for Short to Long Ranges Above-Ground", IEEE Antennas and Wireless Propagation Letters, 15, pp. 1325-1328,2016. 4 Pages.

Arumugam, D.D., "Through-the-Wall Magnetoquasistatic Ranging", IEEE Antennas and Wireless Propagation Letters, vol. 16, pp. 1439-1442.2017. 4 Pages.

Calosso, C.E. et al., "Phase Noise and Amplitude Noise in DDS", 2012 IEEE International Frequency Control Symposium Proceedings, pp. 1-6,May 2012. 6 Pages.

Euler, L. "De Serie Lambertina Plurimisque eius Insignibus Proprietatibus", Acta Acad. Scient. Petropol., 2, pp. 29-51,(1783).

International Search Report for PCT Application No. PCT/US2018/ 064798 filed on Dec. 12, 2018 on behalf of California Institute of Technology, dated Apr. 30, 2019. 3 Pages.

Kalman, R.E. "A New Approach to Linear Filtering and Prediction Problems", Journal of Basic Engineering, 82(1), pp. 35-45,(1960). 12 pages.

Macagno, E., Leonardian Mechanics: History of Kinematics, Inception of Modern Kinematics, Issue 112 of IIHR Monograph, Iowa Institute of Hydraulic Research,(1991). 137 pages.

Madgwick, S.O.H. et al., "Estimation of IMU and MARG Orientation using a Gradient Descent Algorithm", 2011 IEEE International Conference on Rehabilitation Robotics, pp. 179-185,(Jun. 2011). 7 Pages.

Marins, J.L. et al., "An Extended Kalman Filter for Quaternion-Based Orientation Estimation Using MARG Sensors", Proceedings of the 2001 IEEE/RSJ International Conference on Intelligent Robots and Systems. Expanding the Societal Role of Robotics in the Next Millennium (Cat. No. 01CH37180), pp. 2003-2011, vol. 4,(2001). 10 pages.

Nilsson, M., "Kalman Filtering with Unknown Noise Covariances", Proc. Reglermote, KTH, Stockholm, Sweden,(May 2006). 4 pages.

Raab, F. et al., "Magnetic Position and Orientation Tracking System", IEEE Transactions on Aerospace and Electronic Systems, vol. AES-15. No. 5, pp. 709-718,(Sep. 1979). 10 Pages.

Teixeira, T. et al., "A Survey of Human-Sensing: Methods for Detecting Presence, Count, Location, Track, and Identity", ENALAB, Yale University, Tech. Rep. Sep. 2010,(Sep. 2010). 42 pages.

Welch, G. et al., "Motion Tracking: No Silver Bullet, but a Respectable Arsenal", IEEE Computer Graphics and Applications, 22(6), pp. 24-38,(Nov./Dec. 2002). 15 Pages.

Woodman, O., "An Introduction to Inertial Navigation", Technical Report 696, University of Cambridge,(Aug. 2007). 37 pages.

Written Opinion for International PCT Application No. PCT/US2018/ 064798 filed on Dec. 12, 2018 on behalf of California Institute of Technology, dated Apr. 30, 2019. 7 Pages.

Abrudan, T. E., et al., "Distortion rejecting magneto-inductive three-dimensional localization (magloc)," IEEE Journal on Selected Areas in Communications, vol. 33, No. 11, pp. 2404-2417, Nov. 2015. 14 Pages.

Arumugam D. et al., "Decoupled magnetoquasistatic theory for long-range 3D positioning in on-line-of-sight environments" IEEE, Aug. 2015, 7 pages.

Arumugam, D. et al., "Higher Order Loop Corrections for Short Range Magnetoquasistatic Position Tracking", 2011 IEEE International Symposium on Antennas and Propagation (AP-S/URSI), pp. 1755-1757, (2011).

Arumugam, D., et al., "Long Range through-the-wall Magnetoquasistatic Coupling and Application ro Indoor Positioning System," IEEE Antennas and Wireless Propagation Letters, vol. 19, Published Jan. 16, 2020. pp. 507-511. 5 Pages.

Arumugam D. et al., "Magnetoquasistatic position measurement above earth using the exact integral solutions" *Jet Propulsion Lab.*, Aug. 2015, 5 pages.

Arumugam D. "Magneto-Electric Quasi-Static (MEQS) Fields for Position and Orientation Sensing in Heavy Metallic Non-Line-of-Sight (NLoS) Environments" *NASA—Jet Propulsion Laboratory*, Jan. 2020, 13 pages.

Arumugam D. "Non-Line-of-Sight Quasistatic Localization" *NASA— Jet Propulsion Laboratory*, Feb. 2018, 4 pages.

Arumugam, D.D. et al., "Error Reduction in Magnetoquasistatic Positioning Using Orthogonal Emitter Measurements", IEEE Antennas and Wireless Propagation Letters, vol. 11, pp. 1462-1465, (2012).

Arumugam, D.D. et al., "Experimental Demonstration of Complex Image Theory and Application to Position Measurement", IEEE Antennas and Wireless Propagation Letters, vol. 10, pp. 282-285, (2011).

Arumugam, D.D et al., "Three-Dimensional Position and Orientation Measurements Using Magneto-Quasistatic Fields and Complex Image Theory", IEEE Antennas and Propagation Magazine, vol. 56, No. 1, pp. 160-173, (Feb. 2014).

Arumugam, D.D. "Full-Wave Exact Integral Solutions of a Current Carrying Loop in a General Half-Space" *2013 IEEE Antennas and*

(56) References Cited

OTHER PUBLICATIONS

*Propagation Society International Symposium (APSURSI)*, Institute of Electrical and Electronics Engineers. 2013. pp 1038-1039. 3 pages.
Arumugam, et al., "Experimental study on the effects of groups of people on magnetoquasistatic positioning accuracy," in Antennas and Propagation Society International Symposium (APSURSI), 2012 IEEE, 2012, pp. 1-2.
Bannister et al. "Modified Image Theory Quasi-Static Range Subsurface-to-Subsurface and Subsurface-to-Air Propagation Equations" *NUSC Technical Report, Naval Underwater Systems Center*. Oct. 1977. No. 5647. 38 pages.
Blankenbach, J., et al., , "A robust and precise 3d indoor positioning system for harsh environments," in 2012 International Conference on Indoor Positioning and Indoor Navigation (IPIN), Nov. 2012, pp. 1-8. 8 Pages.
Blankenbach, J., et al.,., "Position estimation using artificial generated magneticfields,"in 2010 International Conference on Indoor Positioning and Indoor Navigation, Sep. 2010, pp. 1-5. 5 pages.
Bouwkamp, "Theoretical and numerical treatment of diffraction through a circular aperture," IEEE Trans. Antennas Propagation, vol. AP-18, pp. 152-176, Mar. 1970.
De Angelis et al. "An Indoor AC Magnetic Positioning System"*IEEE Transactions on Instrumentation and Measurement, Institute of Electrical and Electronics Engineers*. May 2015. vol. 64, No. 5. pp. 1275-1283. 9 pages.
Denis, B. et al., "Impact of NLOS Propagation upon Ranging Precision in UWB Systems", IEEE Conference on Ultra Wideband Systemsand Technologies, pp. 379-383, (Nov. 16-19, 2003).
Eggimann, "Higher-order evaluation of electromagnetic diffraction by circular disks," IRE Trans. Microwave Theory Tech., vol. MTI-9, pp. 408-418, Sep. 1961.
Fang, D.G. et al., "Discrete Image Theory for Horizontal Electric Dipoles in a Mulitlayered Medium", IEEE Proceedings on Microwaves, Antennas and Propagation, 135(5), pp. 297-303, (Oct. 1988).
International Preliminary Report on Patentability for International PCT Application No. PCT/US2018/027184 filed on Apr. 11, 2018 on behalf of California Institute of Technology dated Oct. 15, 2019 7 pages.
International Preliminary Report on Patentability for International PCT Application No. PCT/US2018/064798 filed on Dec. 10, 2018 on behalf of California Institute of Technology, dated Jun. 26, 2020. 9 Pages.
International Search Report for PCT/US2018/027184 filed Apr. 11, 2018 on behalf of California Institute of Technology, dated Jul. 30, 2018. 3 pages.
Jiang, Z. et al., "NLOS GPS Signal Detection using a Dual-Polarisation Antenna", GPS Solutions, vol. 18, pp. 15-26, (2014).
Kalmus, H. P. , "A new guiding and tracking system," Aerospace and Navigational Electronics, IRE Transactionson, vol. ANE-9, No. 1, pp. 7-10, Mar. 1962. 4 Pages.
Koutsou, A.D. et al., "Preliminary Localization Results With An RFID Based Indoor Guiding System", Intelligent Signal Processing, IEEE International Symposium, pp. 1-6, (2007).
Kriezis, E.E. et al., "Eddy Current Distribution and Loss in a Semi-Infinite Conducting Space Due to a Vertical Current Loop", ETZ Archive, pp. 201-207, (Jul. 1979).
Notice of Allowance for U.S. Appl. No. 15/339,663, filed Oct. 31, 2016 on behalf of California Institute of Technology, dated Apr. 3, 2019. 10 pages.
Notice of Allowance for U.S. Appl. No. 15/339,663, filed Oct. 31, 2016, on behalf of California Institute of Technology, dated Dec. 28, 2018. 10 pages.
Notice of Allowance for U.S. Appl. No. 16/470,189, filed Jun. 14, 2019 on behalf of California Institute of Technology, dated Mar. 5, 2020. 14 pages.
Notice of Allowance for U.S. Appl. No. 14/876,736, filed Oct. 6, 2015 on behalf of California Institute of Technology, dated Jan. 26, 2017. 9 pages.
Pasku, V., et al, "Magnetic field-based positioning systems," IEEE Communications Surveys Tutorials, vol. 19, No. 3, pp. 2003-2017, third quarter 2017. 15 Pages.
Pirkl, G., et al., "Robust, low cost indoor positioning using magnetic resonant coupling," in Proceedings of the 2012 ACM Conference on Ubiquitous Computing, ser. UbiComp'12. New York, NY, USA: ACM, 2012, pp. 431-440. [Online], Available: http://doi.acm.org/10.1145/2370216.2370281. 10 Pages.
Prigge, E. A., et al., "Signal architecture for a distributed magnetic local positioning system," IEEE Sensors Journal, vol. 4, No. 6, pp. 864-873, Dec. 2004. 10 Pages.
Raab, F.H. "Quasi-Static Magnetic-Field Technique for Determining Position and Orientation", IEEE Transactions on Geoscience and Remote Sensing, vol. GE-19, No. 4, pp. 235-243, (Oct. 1981).
Reynolds, M. "Low Frequency Indoor Radiolocation", Ph.D. Dissertation, Media Arts and Sciences, MIT, (2003). 141 pages.
Schweizer, J. et al., "Testing the Performance of Avalanche Transreceivers",Cold Regions Science and Technology, 37, pp. 429-438, (2003).
Sheinker, A., et al., "A method for indoor navigation based on magnetic beacons using smartphones and tablets,"Measurement 81, 197-209. 2016. 14 Pages.
Wait, J.R. "Image Theory of a Quasistatic Magnetic Dipole Over a Dissipative Half Space" *Electronics Letters, Institute of Electrical and Electronics Engineers*. Jun. 1969. vol. 5, No. 13. pp. 281-282. 3 pages.
Written Opinion for PCT/US2018/027184 filed Apr. 11, 2018 on behalf of California Institute of Technology, dated Jul. 30, 2018. 6 pages.
Arumugam D et al., "An active position sensing tag for sports visualization in American football," *2013 IEEE International Conference on RFID (RFID)*, Penang,2013, pp. 96-103.
Arumugam, Darmindra, D., "Through the Wall Magnetoquasistatic Ranging", *IEEE Antenna and Wireless Propagation Letters*, vol. 16, 2017. pp. 1439-1442. 4 pages.
Haus, Hermann A.; Melcher, James R. (1989). "Magnetoquasistatic Fields: Superposition Integral and Boundary Value Points of View". *Electromagnetic Fields and Energy*. Prentice Hall. p. 310-370. ISBN 978-0-13-249020-7.( https://ocw.mit.edu/resources/res-6-001-electromagnetic-fields-and-energy-spr.
Non-Final Office Action for U.S. Appl. No. 16/987,205, filed Aug. 6, 2020 on behalf of California Institute of Technology dated Mar. 23, 2022 43 pages.
Non-Final Office Action for U.S. Appl. No. 17/087,546, filed Nov. 2, 2020, on behalf of California Institute of Technology, dated Oct. 13, 2021. 33 Pages.
Notice of Allowance for U.S. Appl. No. 17/087,546, filed Nov. 2, 2020 on behalf of California Institute of Technology, dated Mar. 10, 2022. 9 Pages.
Raab, F.H., et al. "Magnetic position and orientation tracking system." IEEE Transactions on Aerospace and Electronic systems 5, Sep. 1979. pp. 709-718. 10 Pages.
Raab, F.H., et al., "Quasi-static magnetic-field technique for determining position and orientation." IEEE Transactions on Geoscience and Remote Sensing 4, Oct. 1981. pp. 235-243. 9 Pages.
Sheinker, A., et al., "Localization in 2D using beacons of low frequency magnetic field." IEEE Journal of Selected Topics in Applied Earth Observations and Remote Sensing 6.2, 2012. pp. 1020-1030. 11 Pages.

* cited by examiner

WIRELESS MEASUREMENT OF LINEAR AND ANGULAR VELOCITY AND ACCELERATION, AND POSITION, RANGE, AND ORIENTATION, VIA WEAKLY-COUPLED QUASISTATIC MAGNETIC FIELDS

CROSS REFERENCE TO RELATED APPLICATIONS

The present application claims priority to U.S. Provisional Patent Application No. 62/597,102, filed on Dec. 11, 2017, the disclosure of which is incorporated herein by reference in its entirety.

STATEMENT OF INTEREST

The invention described herein was made in the performance of work under a NASA contract NNN12AA01C, and is subject to the provisions of Public Law 96-517 (35 USC 202) in which the Contractor has elected to retain title.

TECHNICAL FIELD

The present disclosure relates to kinematic sensing. More particularly, it relates to wireless vector kinematic sensing via weakly-coupled magnetic fields.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

In a first aspect of the disclosure, a method is described, the method comprising: providing a transmitter configured to transmit quasistatic magnetic fields in one or more transmitter axes; providing a receiver configured to receive quasistatic magnetic fields in one or more receiver axes; transmitting, by the transmitter, the quasistatic magnetic fields in one or more frequency bands; detecting, by the receiver, one or more quasistatic magnetic field couplings between each axis of the one or more transmitter axes and each axis of the one or more receiver axes; calculating a sum function by adding power measurements of all of the one or more quasistatic magnetic field couplings; calculating a ratio function by taking a ratio between all of the power measurements of the one or more quasistatic magnetic field couplings; inverting the sum function and the ratio function by a direct linear inversion calculation; calculating, from the inverted sum function, a drift-free orientation-invariant range between the transmitter and the receiver; calculating, from the inverted ratio function, a drift-free range-invariant orientation between the transmitter and the receiver; calculating a drift-free position of the transmitter or of the receiver, based on the drift-free orientation-invariant range and on the drift-free range-invariant orientation; applying a filter to the drift-free orientation-invariant range, to the drift-free range-invariant orientation, and to the drift-free position, to reduce white noise, thereby obtaining a filtered drift-free range, a filtered drift-free orientation, and a filtered drift-free position; calculating a linear velocity by taking a derivative of the filtered drift-free position; calculating a linear acceleration by taking a derivative of the linear velocity; calculating an angular velocity by taking a derivative of the filtered drift-free orientation; and calculating an angular acceleration by taking a derivative of the angular velocity, wherein: a center frequency of each of the one or more frequency bands corresponds to a wavelength $\lambda$, and a range between the transmitter and the receiver r is: $r < \lambda/2\pi$.

DETAILED DESCRIPTION

The present disclosure describes drift-free wireless kinematic sensing of position, orientation, linear and angular velocity and acceleration via measurements of quasi-static magnetic fields.

The development of modern mobile electronic devices (e.g., cellphones, game devices, tablet computers) has placed ongoing demands on wireless kinematic and navigation sensors. These sensors can be used for several applications (e.g., search and rescue, kinesiology, virtual reality, surgery), which require different types of connectivity (e.g., local navigation, motion sensing). Modern kinematic sensors such as accelerometers, gyroscopes, magnetic tracking, infrared and optical sensors, acoustic sensors, and camera-based imaging still do not provide complete drift-free kinematics of a body or object in non-line-of-sight (NLoS) environments.

Accelerometers, gyroscopes, and magnetic tracking sensors do not require line-of-sight and have use in many applications. Modern accelerometers and gyroscopes based on microelectromechanical systems (MEMS) can be advantageously fused to enable gravity-removed acceleration and orientation. However, these sensors cannot provide drift-free measurements of vector velocity, position, or orientation. Magnetic tracking devices use very low frequencies to avoid ground effects, which limit their use to: a distance of only a few meters, low position and orientation update rates, and no measurements of vector linear or angular velocity and acceleration due to their low signal-to-noise (SNR) rate and update rate. Magnetoquasistatic (MQS) tracking techniques use frequencies of up to a few hundred kiloHertz, which still places them within the magnetoquasistatic regime. The MQS regime implies a distance between the sensor and the object to be sensed much smaller than the wavelength of the magnetoquasistatic field: $r \ll \lambda$. MQS tracking techniques enable sensing at up to hundreds of meters away, with high update rates, by correcting for Eddy currents in nearby conductors or the ground, as described in Refs. [6, 7]. MQS tracking has been demonstrated to have a long range in through-the-wall indoor environments (Ref. [8]), highlighting its applicability in heavy multi-path NLoS environments.

By measuring position and orientation of an object with high SNR and update rates, MQS tracking systems can permit low noise derivates via an optimal filter, such as the Kalman filter (see Ref. [9]), additionally providing the drift-free vectors of linear and angular velocity and acceleration. As known to the person of ordinary skill in the art, Kalman filtering, also known as linear quadratic estimation, is an algorithm based on a series of measurements taken over time, containing statistical noise and other inaccuracies. A Kalman filter produces estimates of unknown variables that tend to be more accurate than those based on a single measurement alone, by estimating a joint probability distribution for the variables for each timeframe. The MQS field generation carried out by a digitally synthesized signal provides high a signal to noise ratio, so that the noise in the channel is limited to the receiver noise. MQS systems described in the present disclosure are operated in an interference-free narrow band, and at a frequency sufficiently high to neglect 1/f noise. The high frequency requirement is also derived by Faraday's law which imposes a signal-to-noise requirement, due to $V=2\pi j \times f_0 \times B$, where V is the voltage sensed, B is the magnetic field, and $f_0$ is the frequency. For useful ranges greater than 3-5 m, given regulatory requirements (by the FCC) for transmitted power, the effective MQS lower frequency ranges are in the 5-10 kHz range.

The MQS system is derived by inductive coupling, with the two-sided bandwidth, B, defined as $B=f_0/Q$, where the $f_0$ is the center frequency, and Q is the quality factor of the inductive antenna element of the MQS system. MQS systems require quasistatic operation such that range to device is $r<\lambda_0/2\pi$, where r is the range, and $\lambda_0$ is the center wavelength. Therefore, $\lambda_0>2\pi r$. Using the speed of light conversion of wavelength to frequency, this expression relates to $f_0<c/2\pi r$, where c is the speed of light in free space. For ranges of about 100 m, this corresponds to center frequencies less than 500 kHz. The quality factor of the inductive antenna system is given by $Q=2\pi f_0 L/R$, where L is the inductance and R is the resistance. For most systems with strong inductances in the >1 mH ranges, and low resistances in the <2Ω range, this corresponds to a quality factor Q>1500. Therefore, the bandwidth is B<400 Hz, and can be as low as 100 Hz. This is a very narrow bandwidth, and thus a center frequency $f_0$ can be carefully selected such that this small bandwidth is not being interfered by external or other sources, i.e., giving an interference-free channel.

MQS systems are also operated with high gain receiver amplification—therefore Gaussian thermal noise dominates. Filters such as Kalman filters can be used to estimate the noise contributions in MQS systems since the noise and signal variances are Gaussian in nature. Filters can be used to remove noise contributions to obtain signaling void of noise. This process is key when computation of higher order derivate of position and orientation are needed to obtain error-free linear and angular, velocity and acceleration.

Multiple types of filters can be used for this purpose, which includes electronic filters (having passive or active components), mechanical filters (transducers or mechanical components), distributed element filters (discreet lumped elements), or digital filters (digital filters implemented using mathematical algorithms). The use of digital filters provides the most flexibility as these can tuned to the noise distribution of the data. Most digital filters are based on Fourier transforms, including low-pass filters, high-pass filters, and band-pass filters. These are useful when precise knowledge of the noise distribution is not known. Another form of a digital filter uses a state-space model. An established state-space filter is the Kalman filter. The Kalman filter is an optimal filter when: a) the model matches the real system, b) the entering noise is white (Gaussian, for example) and c) the co-variances of the noise are exactly known.

Figure 1:
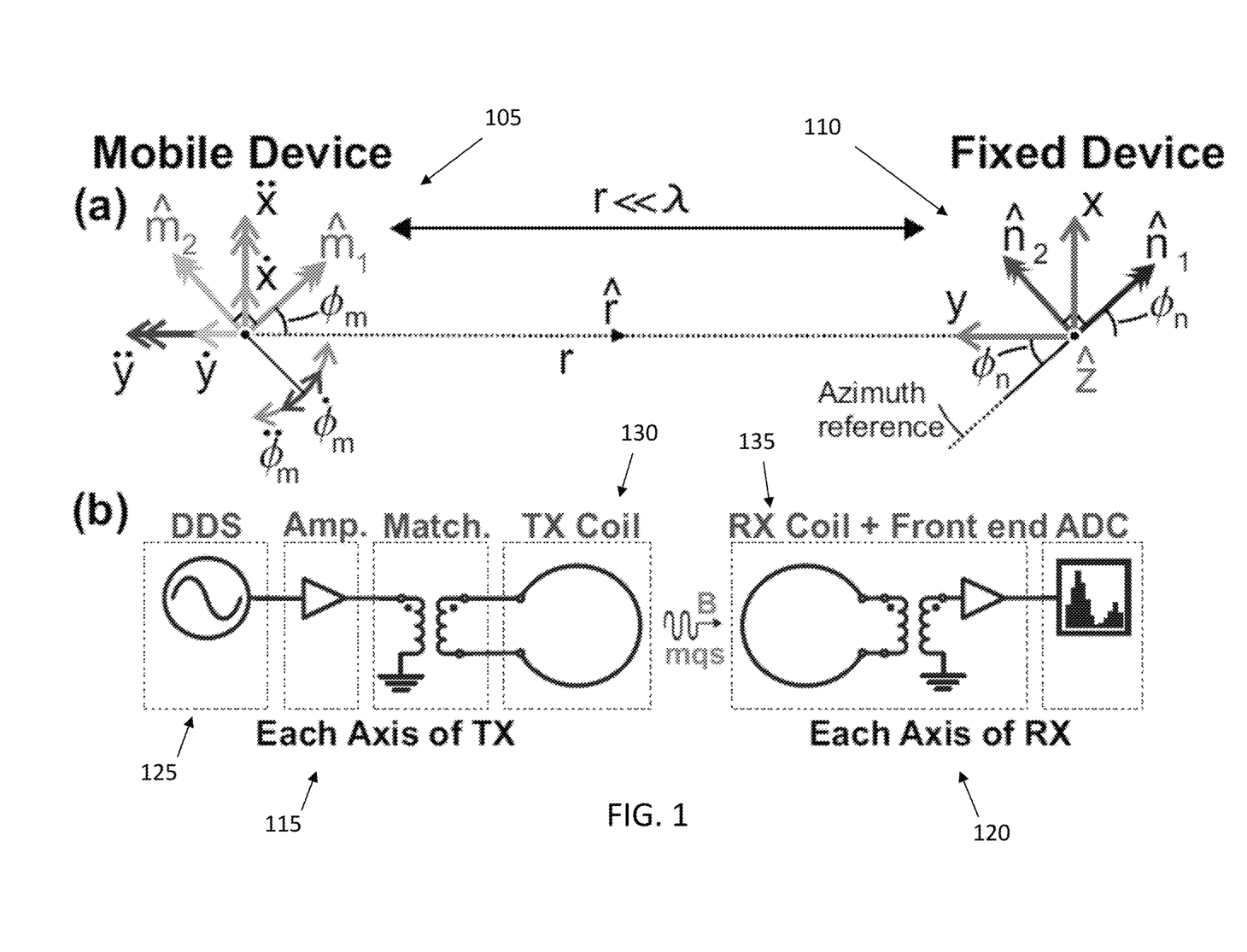
FIG. 1 illustrates an exemplary transmitter and receiver.

FIG. 1 illustrates, in panel a, an exemplary two-dimensional (2D) system to sense the vector kinematics of a mobile MQS transmitter (TX, 105) device relative to a fixed receiver (RX, 110) device. In panel b, FIG. 1 illustrates a block diagram of a single axis of the TX and RX system of panel a. In FIG. 1, the vector components of the magnetoquasistatic fields are illustrated for both transmitter and receiver, along with the angles between the vector components. Panel b of FIG. 1 illustrates several electronic components that will be known to the person of ordinary skill in the art, such as a digitally synthesized signal (DDS) source, amplifiers, matching module, coils, and analog-to-digital converters (ADC). The system utilizes Fast Fourier transforms (FFT).

The present disclosure describes the kinematic sensing of a mobile transmitting MQS device relative to a fixed receiving MQS device in a lossy dielectric NLoS medium. The voltage sensed by a coil due to a MQS dipole field up to a few skin-depths away is given by $V=-j\omega[\vec{B}\cdot\hat{n}]a'$ (see Ref. [8]):

$$^S V \approx -j\frac{\omega\mu_0 a'}{4\pi}e^{-\alpha\kappa r}\left[\frac{3(\hat{m}\cdot\hat{r})(\hat{n}\cdot\hat{r})-\hat{m}\cdot\hat{n}}{r^3}\right] \quad (1)$$

where a' is the coil's surface area, $\hat{n}$ is the normal unit vector, $\vec{B}$ the magnetic field, $\omega$ the radial frequency, $\vec{r}=r\hat{r}$ the dipole range vector, $\vec{m}$ the magnetic moment with $|\vec{m}|=1$ Am$^2$, $\kappa=2/(\delta(1-j))$, $\delta$ the bulk depth of penetration, a the depth constant (see Ref. [8]), and S denotes the signal with no noise.

Figure 2:
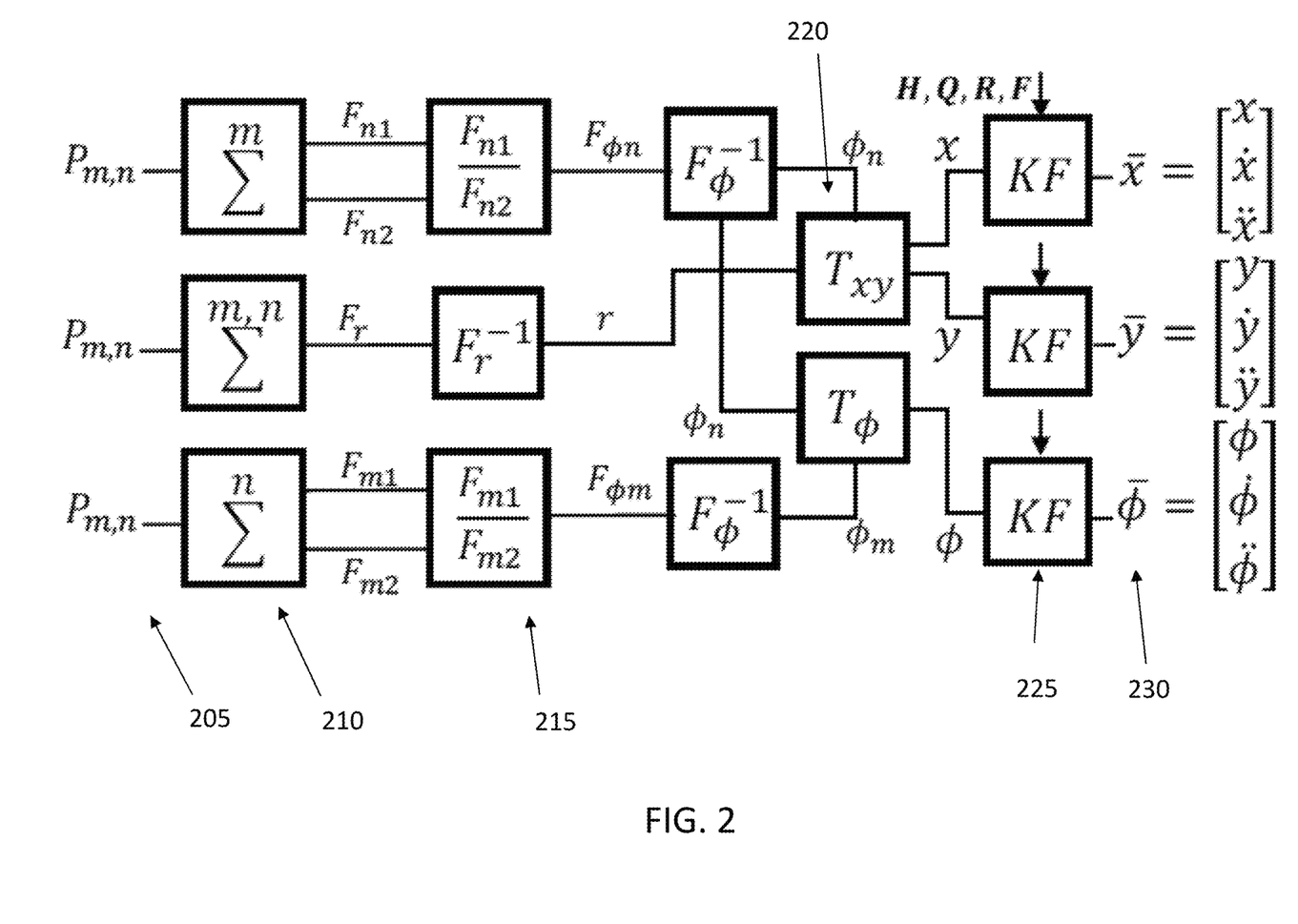
FIG. 2 illustrates a block diagram of the MQS inversion algorithm.

FIG. 1 panel a focuses on the two-dimensional (2D), x, y, φ, 3 degrees of freedom (DOF) problem, which requires two orthogonal dipoles at the transmitter (TX) and receiver (RX) (2×2=4 field couplings). To permit linear sensitivity to position and orientation, the field couplings need to be rewritten in transmit-centric and receive-centric forms (see Ref [6]):

$$^S F_{m1}=|^S V|_{(m1\to n1)}^2+|^S V|_{(m1\to n2)}^2$$
$$^S F_{m2}=|^S V|_{(m2\to n1)}^2+|^S V|_{(m2\to n2)}^2$$
$$^S F_{n1}=|^S V|_{(n2\to m1)}^2+|^S V|_{(n2\to m2)}^2$$
$$^S F_{n2}=|^S V|_{(n2\to m1)}^2+|^S V|_{(n2\to m2)}^2 \quad (2)$$

where $^S F_{m1}$ and $^S F_{m2}$ are the transmit-centric equations for transmitter TX 1 and 2 (m1,m2), which describe the total field power measured at all receivers RX(s) due to each TX, and $^S F_{n1}$ and $^S F_{n2}$ are the receive-centric equations for receivers RX 1 and 2 (n1,n2), which describe the total power of all transmitters TX(s) measured at each receiver RX (see Ref [6]). The method to obtain Eqs. (2) is summarized in FIG. 2, where $P_{m,n}$ (205) is the power of each of the 2×2 field couplings for the transmitters and receivers as described above. FIG. 2 illustrates a block diagram of the MQS inversion algorithm to obtain vector kinematics of a mobile device.

The system for each channel is illustrated in FIG. 1 panel b, for the transmitter side (115) and the receiver side (120). The TX tone generation carried out by a digitally synthesized signal (DDS,125) provides high SNR, so that the noise in the channel is limited to the RX noise. MQS systems are operated in an interference-free narrow band, and at a frequency sufficiently high to neglect 1/f noise. MQS system are also operated with high gain receiver amplification— therefore Gaussian thermal noise, $^NV$, dominates. The received voltage can therefore be considered as $V \approx {}^SV + {}^NV$. The $F_{m,n}$ terms in Eqs. (2) are power-related by $|V|^2 = VV^*$. Due to the quasistatic operation (kr<<1), the phase is negligible ($e^{-jkr} \sim 1$), so that:

$$|V|^2 = \left(-j\omega[\vec{B}\cdot\hat{n}]a' + {}^NV\right)\left(j\omega[\vec{B}\cdot\hat{n}]a' + {}^NV\right) \quad (3)$$

$$= \left(\omega[\vec{B}\cdot\hat{n}]a'\right)^2 + {}^NV^2$$

From Eqs. (2), assuming equal thermal noise in each channel to simplify the derivation, it is possible to obtain:

$$F_{m1} = {}^SF_{m1} + {}^NP, F_{m2} = {}^SF_{m2} + {}^NP,$$

$$F_{n1} = {}^SF_{n1} + {}^NP, F_{n2} = {}^SF_{n2} + {}^NP, \quad (4)$$

where $^NP$ is the thermal noise power. To obtain ranging that is orientation invariant, the contributions from both transmit centric equations are summed, as can been seen from Ref. [8] and (210) in FIG. 2:

$$F_r = \left\{ \begin{array}{c} F_{m1} \\ +F_{m2} \end{array} \right\} \approx 5c^2 \left[\frac{e^{-\alpha\kappa r}}{r^3}\right]^2 + 2\times{}^NP = {}^SF_r + 2\times{}^NP, \quad (5)$$

where $c = -j\omega\mu_0 a'/(4\pi)$. To obtain orientation sensing that is invariant of range, a ratio is applied instead, as shown (215) in FIG. 2. However, here the orientations are either due to orientations of the mobile device ($\phi_m$), or direction angles which are relative to the fixed device orientations ($\phi_n$) (see FIG. 1 panel a). The Taylor series of a ratio A/B with added $^NP$ to A and B about $^NP \sim 0$ is:

$$f = \frac{A + {}^NP}{B + {}^NP} \approx \frac{A}{B} + {}^NP\left[\frac{B-A}{B}\right] + O({}^NP^2), \quad (6)$$

which gives the m orientation ratio due to $\phi_m$, $F_{\phi m}$ as:

$$F_{\phi m} = \frac{F_{m2}}{F_{m1}} = \frac{{}^SF_{m2} + {}^NP}{{}^SF_{m1} + {}^NP} \approx \frac{{}^SF_{m2}}{{}^SF_{m1}} + {}^NP \times C_m + O({}^NP^2), \quad (7)$$

where $C_m = ({}^SF_{m2} - {}^SF_{m1})/{}^SF_{m2}$. Similarly, it is possible to rewrite the noise-added $F_{\phi n}$ as:

$$F_{\phi n} = \frac{F_{n2}}{F_{n1}} = \frac{{}^SF_{n2} + {}^NP}{{}^SF_{n1} + {}^NP} \approx \frac{{}^SF_{n2}}{{}^SF_{n1}} + {}^NP \times C_n + O({}^NP^2), \quad (8)$$

where $C_n = ({}^SF_{n2} - {}^SF_{n1})/{}^SF_{n2}$. $C_m$ is an orientation-modulated constant, while $C_n$ is direction-modulated. Equations (5), (7), and (8) show that the noise model is maintained as zero-mean additive Gaussian.

The MQS technique relies on the ability to invert Eqs. (5), (7), and (8) through a direct linear inversion method (see Ref. [6]). The noise-free $^SF_{\phi m}$ has the form and inversion given by Ref. [6] as:

$${}^SF_{\phi m} = \frac{5 - 3\cos(2\phi_{m1})}{5 + 3\cos(2\phi_{m1})}, \phi_m = \frac{1}{2}\cos^{-1}\left[\frac{5 - 5\times{}^SF_{\phi m}}{3\times{}^SF_{\phi m} + 3}\right]. \quad (9)$$

The Taylor series of the inverse orientation functions in Eq. (9), with an arbitrary forward signal, F, which has the form of Eqs. (7) and (8) with added noise, $^NP$, taken about $^NP \sim 0$ is given by:

$$f = \cos^{-1}\left[\frac{5 - 5\times F}{3\times F + 3}\right] = \cos^{-1}\left[\frac{5 - 5\times({}^SF + {}^NP)}{3\times({}^SF + {}^NP) + 3}\right] \approx \quad (10)$$

$$\cos^{-1}\left[\frac{5 - 5\times {}^SF}{3\times {}^SF + 3}\right] + {}^NP \times C_f + O({}^NP^2),$$

where $C_f({}^SF) = 5/[({}^SF-4)(4{}^SF-1)(1+{}^SF)]^{1/2}$ is an $^SF$-modulated constant. Based on Eq. (10), it is possible to derive:

$$\phi_m = \frac{1}{2}\cos^{-1}\left[\frac{5 - 5\times {}^SF_{\phi m}}{3\times {}^SF_{\phi m} + 3}\right] + {}^NP \times C_{\phi m} + O({}^NP^2), \quad (11)$$

$^SF_{\phi m} = {}^SF_{m2}/{}^SF_{m1}$, and $C_{\phi m} = (\frac{1}{2})\times C_f({}^SF_{\phi m})$. Similarly, the direction angle to the device (see Ref [7]) is given by:

$$\phi_n = \frac{1}{2}\cos^{-1}\left[\frac{5 - 5\times {}^SF_{\phi n}}{3\times {}^SF_{\phi n} + 3}\right] + {}^NP \times C_{\phi n} + O({}^NP^2), \quad (12)$$

where $^SF_{\phi n} = {}^SF_{n2}/{}^SF_{n1}$, and $C_{\phi n} = (\frac{1}{2})\times C_f({}^SF_{\phi n})$.

The range function, $F_r$, given in Eq. (5) has not been directly inverted previously, but can be found using a Lambert W function (see Ref. [11]):

$${}^Nr = \frac{3}{\alpha\kappa} \times W\left[\frac{\alpha\kappa}{3} \times \left(\frac{d}{F_r - 2\times {}^NP}\right)^{1/6}\right], \quad (13)$$

where W is the Lambert W function, the $2\times{}^NP$ factor and $d = 5c^2$ are obtained from Eq. (5), and $^Nr$ is the noise-influenced inverted range. As known to the person of ordinary skill in the art, the Lambert W function is a set of functions comprising the branches of the inverse relation of the function $f(z) = ze^z$, where $e^z$ is the exponential function, and z is any complex number. Taking the Taylor series expansion of $^Nr$ in Eq. (13) about $^NP \sim 0$ gives:

$$r = {}^Sr + {}^NP \times C_r + O({}^NP^2), \quad (14)$$

$C_r = {}^Sr/[2F_r \times (3 + {}^Sr\times\alpha\kappa)]$ is a range-modulated constant, and $^Sr$ is the noise-free inverted range given by:

$${}^Sr = \frac{3}{\alpha\kappa} \times W\left[\frac{\alpha\kappa}{3} \times \left(\frac{d}{F_r}\right)^{1/6}\right]. \quad (15)$$

Equations (11), (12), and (14), noted in FIG. 2 as (220) with $(x, y) = T_{xy}[r, \phi_n]$ and $\phi = T_\phi[\phi_n, \phi_m]$ (T denotes transformations), provide the necessary framework to obtain the complete drift free position and orientation of the mobile device in the presence of noise:

$$x = r\cos\phi_n = [{}^Sr\cos {}^S\phi_n] + {}^NP \times C_x + O({}^NP^2)$$

$$y = r\sin\phi_n = [{}^Sr\sin {}^S\phi_n] + {}^NP \times C_y + O({}^NP^2)$$

$$\phi = \phi_m - \phi_n = [{}^S\phi_m - {}^S\phi_n] + {}^NP \times C_\phi + O({}^NP^2), \quad (16)$$

where (x, y) gives the position of the device, φ gives the orientation of the device, the terms in square brackets denote the noise-free signaling, $C_x = C_r \cos {}^S\phi_n - C_{\phi n}{}^S r \sin {}^S\phi_n$, $C_y = C_{\phi n}{}^S r \cos {}^S\phi_n + C_r \sin {}^S\phi_n$, and $C_\phi = C_{\phi m} - C_{\phi n}$.

The technique described above is simplified to two dimensions (2D). The simplification is to show a proof-of-concept, and is enabled by use of 2-axis orthogonal transmitters and measurements by a 2-axis orthogonal receiver system. The position information noted as x, y locations in Eq. (16) are derived through the range vector (r) and direction angle ($\phi_n$). The direction angle, $\phi_n$, is derived through the ratio function given by $F_{\phi n}$ in Eq. (8), which is the ratio between all signal powers of the 2-axis orthogonal receivers. $\phi_n$ is therefore the direction angle along the x-y plane or about the z-axis, as defined through the spherical coordinate system typically as the azimuthal angle. To determine three-dimensional (3D) direction, an additional polar or zenith angle is needed which is the angle between the z-axis (or vertical axis) and the direction to the device. This angle can be found by taking the power ratio between the all components summed of the z-axis of the receiver to the combined sum of both horizontal components so that:

$$F_{\theta n} = \frac{F_{n3}}{F_{n1} + F_{n2}} \tag{17}$$

where $F_{n3}$ is the z-axis counterpart of the receiver-centric component in Eq. (2) for the 3D problem when the transmitter and receiver are both 3-axis devices. The inversion for $\theta_n$ follows the same form given in Eq. (12), which results in the polar or zenith direction angle. For range in 3D, the $F_r$ formulation in Eq. (5) must also be updated to include the z-axis counterpart of Eq. (2) for the 3D problem when the transmitter and receiver are both 3-axis devices:

$$F_r = F_{m1} + F_{m2} + F_{m3} \tag{18}$$

where $F_{m3}$ is the z-axis counterpart of transmitter-centric component in Eq. (2) for the 3D problem when the transmitter and receiver are both 3-axis devices. The inversion for $F_r$ follows the same form given in Eq. (15), which results in the 3D range. The 3D range to the device along with both azimuthal and polar or zenith direction angles can be used to find the 3D location using the normal Spherical coordinate conversions. 3D orientation of the device follows a similar approach to that given above for direction angles, however here ratios of $F_m$ functions are used instead. The inversions for orientation of the device are identical to that in Eq. (11).

Accelerometers cannot provide drift-free velocity or position sensing due to single and double integration operations. This problem is eliminated if derivatives are used to obtain linear and angular velocity and acceleration from the position and orientation via MQS coupling. However, the signaling given by Eq. (16) is noisy. Differentiation of (16) will amplify noise, and this amplification would grow with the order of the derivatives (see Ref. [12]). Nevertheless, the inversions in Eq. (16) present Gaussian additive noise, thus an optimal Kalman filter (see Ref. [9]) can be used to reduce or remove noise, and estimate the drift-free and noise-free linear and angular velocity and acceleration.

The Kalman mechanics is defined by the predicted time-update and measurement-update equations at discreet step k. The state transition for the kinematic problem considered, usually denoted by F, is well known (see Ref [13]). The Kalman observation model, H, to indicate measurement of position and orientation only (no measurements of derivates), as well as measurement noise covariance, R, is derived from the MQS coupling in Eq. (16) for use in the Kalman mechanics:

$$F = \begin{bmatrix} 1 & \Delta t & \Delta t^2/2 \\ 0 & 1 & \Delta t \\ 0 & 0 & 1 \end{bmatrix}, \quad H = [1, 0, 0], \quad R_k \approx {}^N P \times C_{x,y,\phi}(k-1), \tag{17}$$

where H reflects position/orientation. The measurement noise covariance, $R_k$, is determined by measurement of the radio frequency (RF) systems noise variance, and updated based on $C_x/C_y/C_\phi$ for x/y/φ at (k−1). The initial position and orientation are known, therefore the initial estimated covariance in the Kalman mechanics is a 3×3 array of zeros, while the process noise co-variance, usually denoted by Q, is found by numerical tuning (see Ref [14]).

The x/y/φ measurements in Eq. (16) have orthogonal basis, so the Kalman filter (KF) mechanics is applied to x, y, and φ at each discreet time step k, as illustrated in FIG. 2 (225). For x, y, and φ from Eq. (16), the KF mechanics removes the Gaussian noise optimally (see Ref [9]) to give $\bar{x}$, $\bar{y}$, and $\bar{\phi}$, as shown in FIG. 2 (230), which are noise free (S denotes signaling that is noise free) and includes the first and second derivatives:

$$\begin{bmatrix} {}^S x \\ {}^S \dot{x} \\ {}^S \ddot{x} \end{bmatrix} = KF(\bar{x}), \quad \begin{bmatrix} {}^S y \\ {}^S \dot{y} \\ {}^S \ddot{y} \end{bmatrix} = KF(\bar{y}), \quad \begin{bmatrix} {}^S \phi \\ {}^S \dot{\phi} \\ {}^S \ddot{\phi} \end{bmatrix} = KF(\bar{\phi}). \tag{18}$$

The system used to measure the couplings consisted of a mobile transmitter (TX) and a wide-band receiver (RX) system with 3 orthogonal axes. Each channel of the TX and RX is configured as shown in the block diagram in FIG. 1 panel b. The resonant frequencies of the inductances of the TX coils were tuned, using capacitors, at about 100 kHz. The resonant frequencies for each TX axis were kept at a unique frequency (with about 5 kHz separation), whereas the RX coils were left wideband through a high impedance match. A digitally synthesized signal (DDS,125) source was used to generate the TX tones which are amplified via a high voltage FET (field effect transistor) amplifier and fed to the TX resonant coils (130). The tones received in each RX coil (135) were collected using a 2 MS/s analog-to-digital converter (ADC). Fast Fourier transform (FFT) and peak-detect algorithms were applied to a 10 ms window at each time step, k, to obtain the 3×3 coupled tones. The z axis contributions (from both TX and RX) were discarded in this exemplary experiment to limit the study to the 2D 2×2 problem. Additional details of the system can be found in Ref [8].

Figure 3:
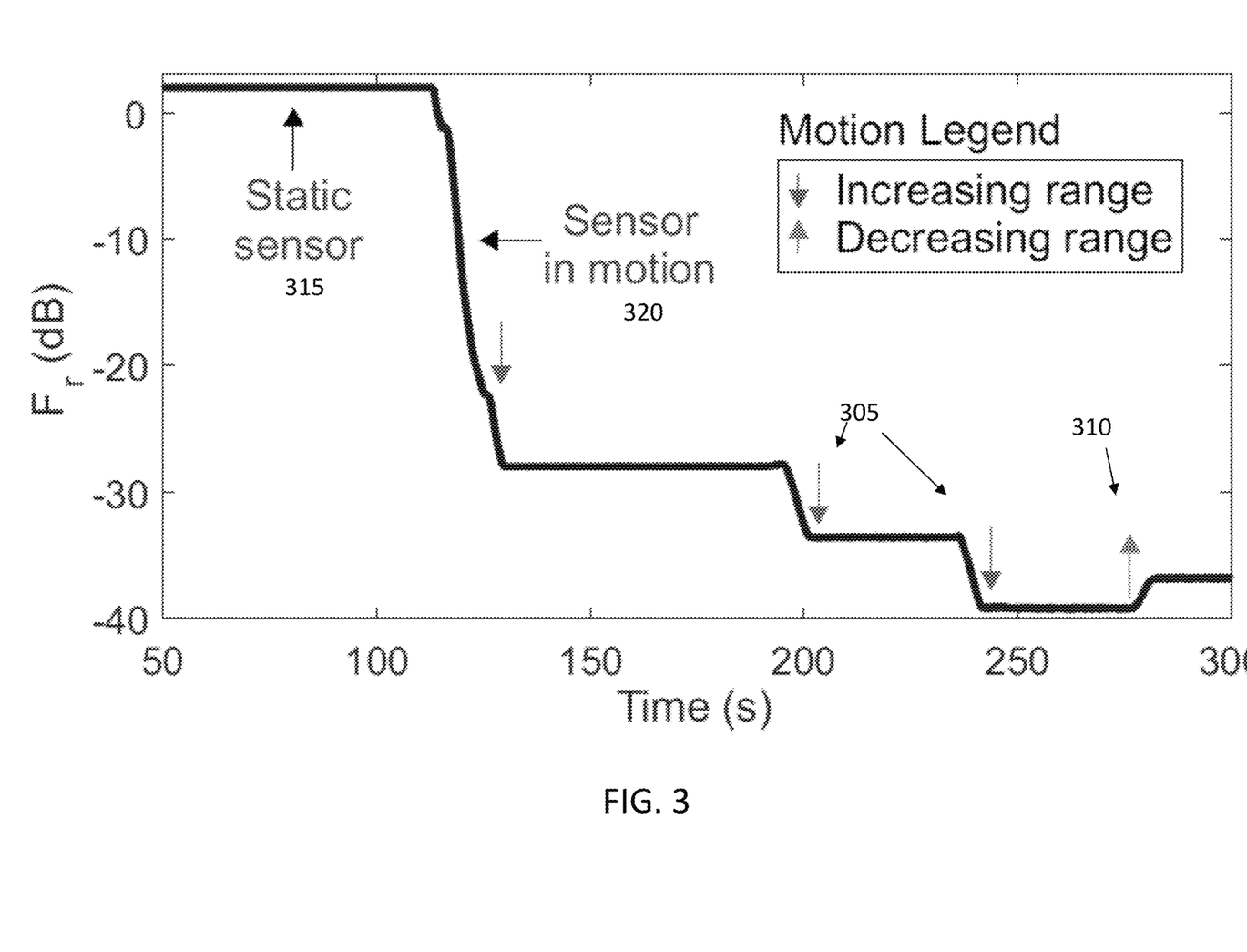
FIG. 3 illustrates measurements for a static and moving sensor.

For the first experiment, the RX was fixed and the mobile TX was moved along the positive y axis (as in FIG. 1 panel a) from 2-10 m over a duration of about 240 s in steps, with stops also at approximately 6.5 m and 8 m, then moved closer to a distance of about 9 m after an additional pause of 30 s. The measured total field power summed from all axes (summation of both TX tones measured in both RX coils), $F_r$, is described by Eq. (5), and shown in FIG. 3. FIG. 3 illustrates measurements of $F_r$ for a range of motion of transmitter sensor (TX) between 2 and 10 m from the receiver (RX). In FIG. 3, the down arrows (305) show increasing range, while the up arrow (310) show decreasing range. The initial part of the graph is for the static sensor (315), while the remaining part of the graph is for the sensor in motion (320).

Figure 4:
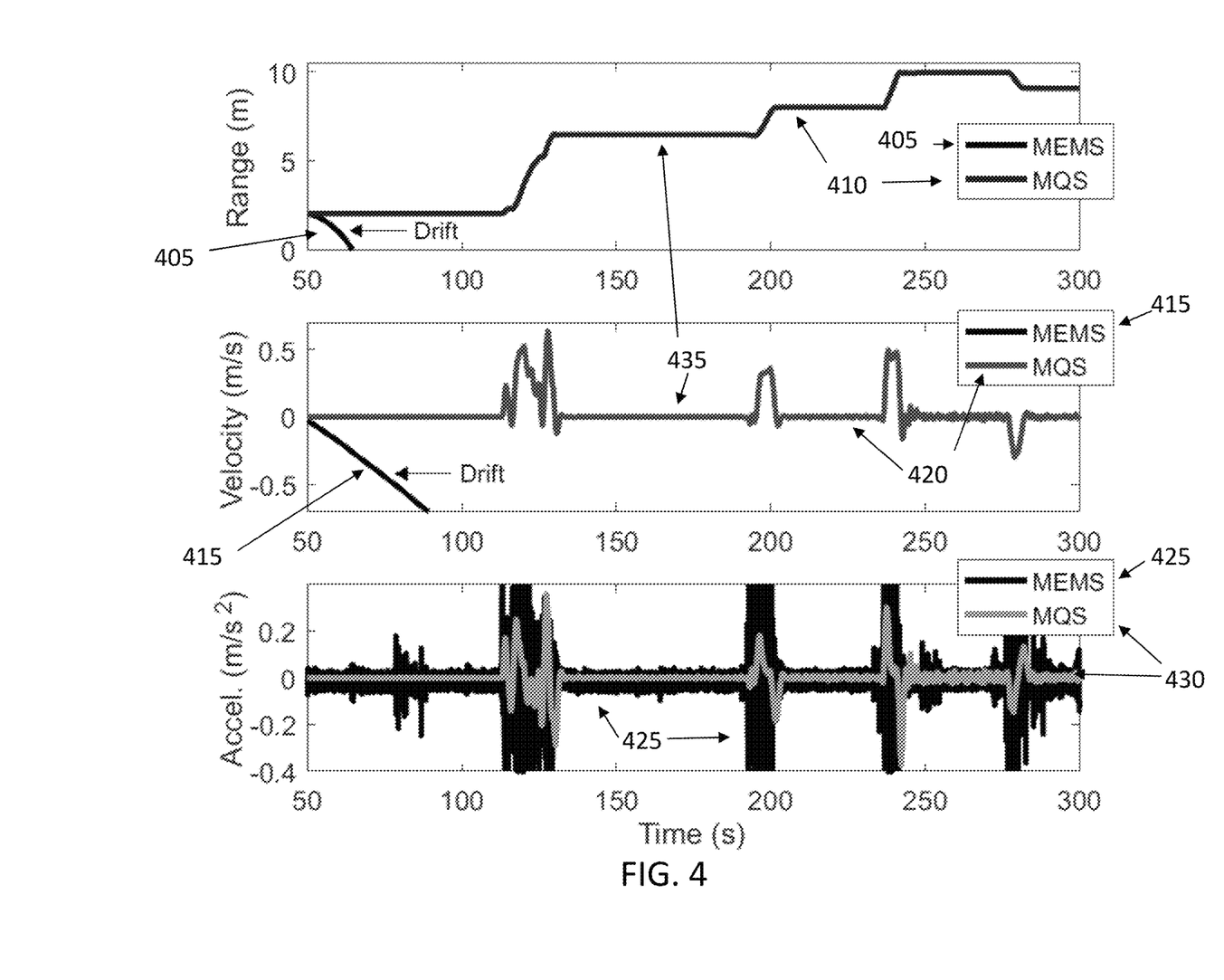
FIG. 4 illustrates measurements of $F_r$ inverted to obtain range, velocity, and acceleration along the y-axis.

FIG. 4 illustrates measurements of $F_r$ inverted to obtain range, velocity, and acceleration along the y axis. In FIG. 4, the data is compared to a co-located tactical-grade MEMS inertial measurement unit (IMU). FIG. 4 illustrates MEMS data (405,415,425) and MQS data (410,420,430).

The flat lines in FIG. 4, e.g. (435), show periods where the mobile sensor remains stationary. To obtain the range, the measured $F_r$ is inverted to solve for range using Eq. (15). For this proof-of-concept experiments, the data was collected in free space, where $\alpha\kappa \to 0$, and Eq. (15) simplifies to $^Sr=(d/F_r)^{1/6}$ as described in Ref [11]. For further simplification, and to study ranging and its derivatives, $\phi_n=90°$ was assumed in this experiment, so that $y=^Sr+^NP\times C_r$. The noise influence is Gaussian, thus the Kalman mechanics in Eqs. (17) and (18) can be used to find the y-directed, noise-free range (as illustrated in FIG. 5 panel a), and its higher order derivatives, velocity (as illustrated in FIG. 5 panel b) and acceleration (as illustrated in FIG. 5 panel c).

A tactical grade, 6 DOF, inertial measurement unit (IMU), as described in Ref [15], was also used in the mobile system as a comparison. The acceleration, velocity, and range shown in FIG. 5 use state-of-the-art IMU algorithms, as described in Ref [4]. It can be seen from FIG. 5 that the acceleration data from the IMU is heavily influenced by noise, which causes its velocity and position estimation to drift (see Ref. [1]). It is well known to the person of ordinary skill in the art that position errors from an IMU, as shown in FIG. 4, grow quadratically with time. The increase in the errors is due to sensitive bias instabilities, noise, temperature effects, and calibration effects (see Ref [16]) that cannot be fully corrected, as described in Ref. [1]. By comparison, the MQS technique described in the present disclosure senses position and orientation with Gaussian noise. The Gaussian noise is removed with a Kalman filter to provide derivatives and higher order derivatives, thus enabling linear and angular velocity and acceleration sensing that is also noise-free and drift-free.

Figure 5:
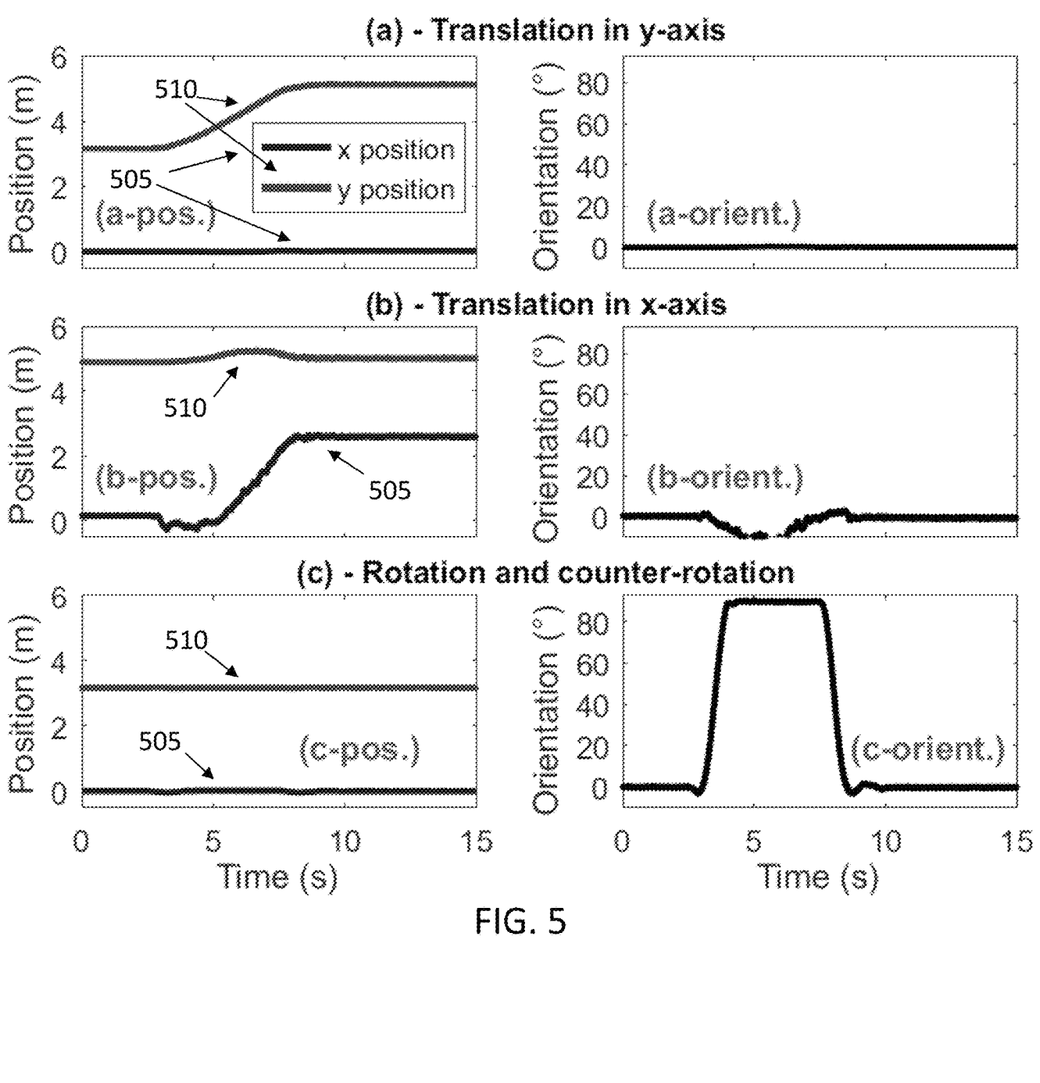
FIG. 5 illustrates inverted results for 2D position and orientation.

FIG. 5 illustrates inverted results for the 2D position and orientation for a translation on the y axis, in panel a. FIG. 5 also illustrates inverted results for the 2D position and orientation for a translation on the x axis, in panel b; and for a rotation and counter-rotation along the z axis, in panel c. In FIG. 5, data is shown for both x position (505) and y position (510).

Figure 6:
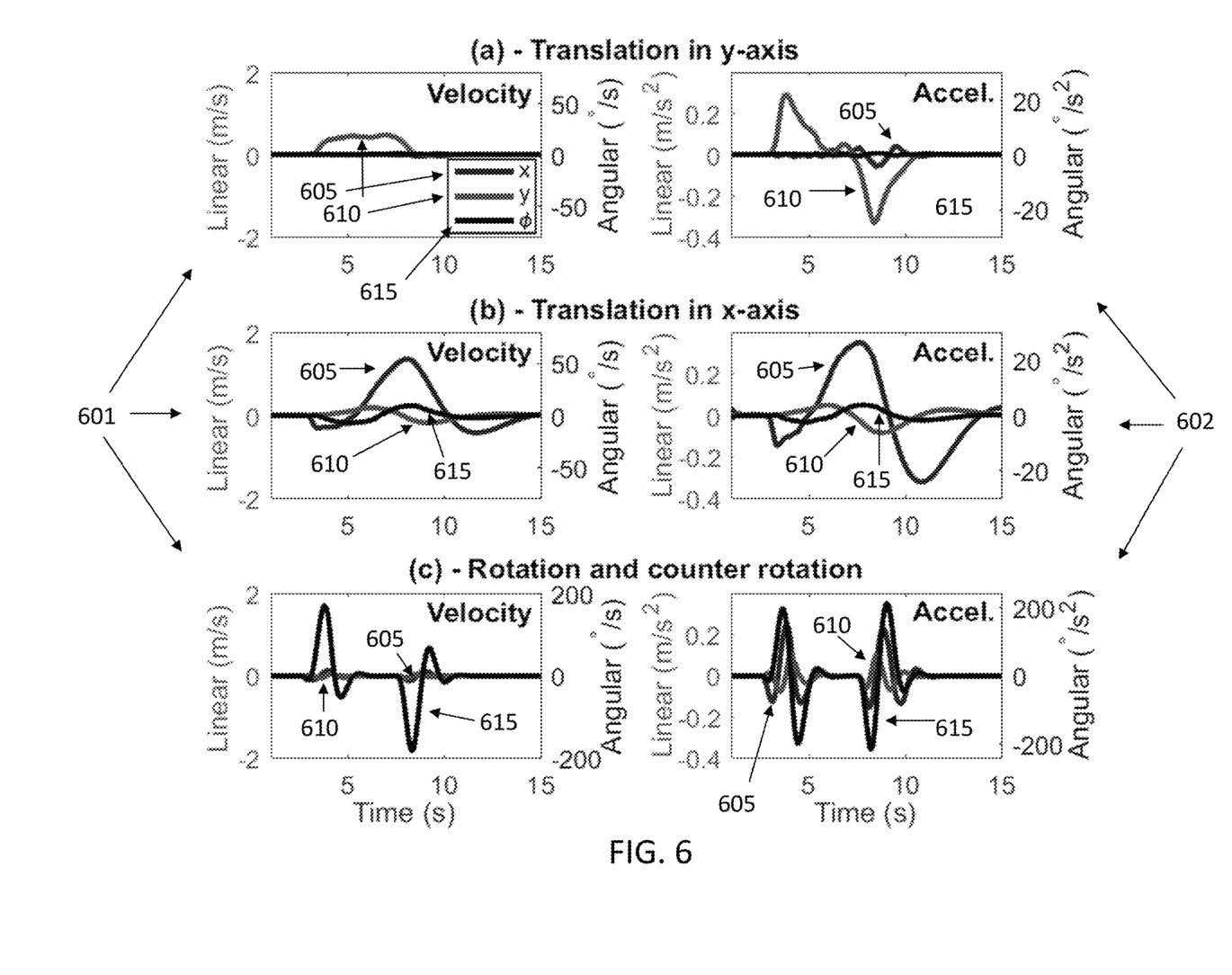
FIG. 6 illustrates inverted results for linear and angular velocity and acceleration.

FIG. 6 illustrates inverted results for linear and angular velocity (601) and acceleration (602) for translation measurements on the y axis (panel a), x axis (panel b), as well as rotation and counter-rotation along the z axis (panel c).

To study the full 2D kinematics, the mobile sensor was translated and rotated in three separate experiments. The first experiment was a translation in the positive y axis between 3-5 m for x=0 m. In the second experiment, the device was moved along the x direction from 0-3 m for y=5 m. In the third experiment, the device was placed back on the positive y axis at (x, y)=(0,3) m, then rotated to $\phi_m=90°$, and then back to $\phi_m=0°$. To solve for the full 2D kinematics, the range solutions were determined using Eq. (15), and $\phi_m$ and $\phi_n$ were determined using Eqs. (11) and (12), where $F_{\phi m}$, and $F_{\phi n}$ are found by taking the ratios of the TX-centric summed power measurements and RX-centric summed power measurements, respectively, as noted in Eqs. (7) and (8) (see FIG. 2). FIG. 5 shows the inverted results for each experiment using Eq. (16). Applying the KF mechanics in Eqs. (17)-(18), the linear and angular velocity and acceleration are found as shown in FIG. 6 (in addition to the position and orientation in FIG. 5).

As described in the present disclosure, drift-free wireless kinematic sensing can be achieved using quasi-static magnetic fields. Since quasi-static magnetic fields are undisturbed by nearby dielectrics, the technique is effective in various non-line-of-sight applications. In some embodiments, the frequency of the quasistatic magnetic fields is less than 500 kHz.

The calculation of combined position, orientation, and linear (spatial) and angular (orientation) velocity and acceleration is described in the present disclosure. The Kalman filter optimally removes the noise so that higher order derivatives of the linear and angular components can be calculated. However, in some embodiments other filters can be used as well. Since MQS noise is largely a Gaussian process, and because the systems model and noise covariance are known, using a Kalman filter is optimal.

In some embodiments, the following steps are taken to calculate position, orientation, and linear (spatial) and angular (orientation) velocity and acceleration of an object. Magnetoquasistatic (MQS) fields are generated using a magnetic antenna (for example a coil antenna). The antenna or exciter is capable of generating tri-axial orthogonal MQS fields. Each orthogonal field can be uniquely identified by an observer (receiver) and does not interfere with other fields. Observation ranges are within the quasistatic range (distance<<wavelength). All unique MQS fields are detected using a magnetic antenna (for example, a coil antenna). A tri-axis detector can be used so that each component senses all three fields uniquely. In other words, the receiver detects 3×3=9 unique quantities.

It is then possible to solve for position and orientation, as described in the present disclosure with regard to the field couplings and inversions. The position and orientation will have additive Gaussian noise in MQS systems, due to interference-free operation that can be accomplished via very narrow-band MQS signaling. Narrow-band signaling is required by MQS signaling due to the size of structures relative to long wavelengths and the technique being used to measure MQS fields. A filter can be used to remove additive Gaussian noise. Different filters can be used, however the Kalman filter is the optimal filter. This is due to the noise being Gaussian additive, the system model is shown to be correct and matches measurements, and the noise covariances are known as shown in the present disclosure.

It is then possible to calculate derivatives and higher order derivatives either using Kalman mechanics directly (Kalman mechanics can be used to estimate higher order derivates) or by taking derivatives of the measured quantities after the filters are applied to remove noise. The estimated quantities are position and orientation in 3D space with noise removed, and linear (spatial, e.g. x,y,z) velocity and acceleration, and angular (orientation, e.g., theta and phi) velocity and acceleration. In some embodiments, each transmitter axis is composed of an arbitrarily shaped (circular, square, oval, etc.) single or multi-turn coil of wire, where the open ends of the wire are driven by a harmonic source where the excitation of the source varies sinusoidally in time with a single frequency, generating a quasistatic magnetic field for ranges, r, of $r<\lambda/2\pi$, from the transmitter. For two and three axes systems, each axis is configured orthogonally to each other so that the coil surface normal unit vector of each coil is perpendicular to the others. In some embodiments, a power measurement is taken for each magnetoquasistatic field coupling. The power measurement is calibrated to remove any unknown gain or losses in the measurement. Due to the fact that the coil or antenna is not perfect or ideal, there can be gains or losses in the measurement. These gains or losses are removed though calibration. As known to the person of ordinary skill in the art, taking derivatives to obtain the velocity and acceleration normally is not possible in this type of sensors because of the noise in the range, orientation and position. By the methods of the present disclosure, it is possible to obtain noise-free quantities, or at the very least with a greatly reduced noise. Taking the derivatives to calculate velocity and acceleration now becomes possible.

In some embodiments, taking a Cartesian frame of reference with the origin on one device, and the z axis parallel to the orientation of this device. A vector (with 3 Cartesian components) points towards the second device. The length of this vector is the range. The projected angles of this vector with respect to the Cartesian axes give the direction angles. Depending on whether one, two, or three quasistatic fields are used, the direction angles may be one, two or three angles. The second device has its own coil, two coils, or three orthogonal coils. The axis of the one coil for the 1D implementation may be at an angle with respect to the z axis of the Cartesian frame of reference. Similarly, for the 3 orthogonal coils, they also may be at an angle with respect to the frame of reference and to the first device. This orientation angle or angles give the orientation or attitude of the second device.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] G. Welch and E. Foxlin. Motion tracking: no silver bullet, but a respectable arsenal. *IEEE Computer Graphics and Applications*, 22(6):24-38, November 2002.

[2] A. Savvides T. Teixeira, G. Dublon. A survey of human-sensing: Methods for detecting presence, count, location, track, and identity. *ENALAB, Yale University, Tech. Rep.* 09-2010, September 2010.

[3] J. L. Marins, Xiaoping Yun, E. R. Bachmann, R. B. McGhee, and M. J. Zyda. An extended kalman filter for quaternion-based orientation estimation using marg sensors. In *Proceedings 2001 IEEE/RSI International Conference on Intelligent Robots and Systems. Expanding the Societal Role of Robotics in the the Next Millennium (Cat. No. 01CH37180)*, pages 2003-2011 vol. 4, 2001.

[4] S. O. H. Madgwick, A. J. L. Harrison, and R. Vaidyanathan. Estimation of imu and marg orientation using a gradient descent algorithm. In *2011 IEEE International Conference on Rehabilitation Robotics*, pages 1-7, June 2011.

[5] F. Raab, E. Blood, Steiner T., and Jones H. Magnetic Position and Orientation Tracking System. *IEEE Trans. on Aerospace and Electrical Systems*, AES-15(5):709-718, 1979.

[6] D. D. Arumugam. Decoupled range and orientation sensing in long-range magnetoquasistatic positioning. *Antennas and Wireless Propagation Letters, IEEE*, 14:654-657, 2015.

[7] D. D. Arumugam. Single-anchor 2-d magnetoquasistatic position sensing for short to long ranges above ground. *IEEE Antennas and Wireless Propagation Letters*, 15:1325-1328, 2016.

[8] D. D. Arumugam. Through-the-wall magnetoquasistatic ranging. *IEEE Antennas and Wireless Propagation Letters*, PP(99):1-1, 2016.

[9] R. E. Kalman. A new approach to linear filtering and prediction problems. *Journal of Basic Engineering*, 82(1): 35-45, 03 1960.

[10] C. E. Calosso, Y. Gruson, and E. Rubiola. Phase noise and amplitude noise in DDS. In *2012 IEEE International Frequency Control Symposium Proceedings*, pages 1-6, May 2012.

[11] L. Euler. De serie lambertina plurimisque eius insignibus proprietatibus. *Acta Acad. Scient. Petropol.*, 2:29-51, 1783.

[12] R. S. Anderssen and P. Bloomfield. Numerical differentiation procedures for non-exact data. *Numerische Mathematik*, 22(3):157-182, 1974.

[13] Robert Grover Brown and Patrick Y. C. Hwang. *Introduction to random signals and applied Kalman filtering*. 3. Wiley, 1997.

[14] M. Nilsson. Kalman filtering with unknown noise covariances. *Proc. Reglemente, KTH*, Stockholm, Sweden, pages 1-4, May 2006.

[15] Analog Devices. Adis 16497. http://www.analog.com/en/products/mems/inertial-measurement-units/adis16497.html.

[16] Oliver Woodman. An introduction to inertial navigation. *Technical Report, University of Cambridge, Tech. Rep.* 696, August 2007.

What is claimed is:

1. A method to provide drift-free kinematic measurements of a device comprising:
    providing a transmitter configured to transmit quasistatic magnetic fields in one or more transmitter axes;
    providing a receiver configured to receive quasistatic magnetic fields in one or more receiver axes;
    wherein either the transmitter or the receiver is situated in the device;
    transmitting, by the transmitter, the quasistatic magnetic fields in one or more frequency bands;

detecting, by the receiver, one or more quasistatic magnetic field couplings between each axis of the one or more transmitter axes and each axis of the one or more receiver axes;

calculating a drift-free orientation-invariant range between the transmitter and the receiver, the drift-free orientation-invariant range describing, in a frame of reference, a magnitude of a vector between the receiver and the transmitter;

calculating one or more drift-free range-invariant orientation angles of the device, the one or more drift-free range-invariant orientation angles describing an orientation of the device in the frame of reference;

calculating one or more drift-free range-invariant direction angles of the vector between the receiver and the transmitter in the frame of reference;

calculating a drift-free position of the device in the frame of reference;

applying a filter to the drift-free orientation-invariant range, to the one or more drift-free range-invariant orientation angles, to the one or more drift-free range-invariant direction angle, and to the drift-free position, to reduce white noise, thereby obtaining a filtered drift-free range, a filtered drift-free orientation, and a filtered drift-free position of the device; and based on the filtered drift-free range, filtered drift-free orientation, and filtered drift-free position, calculating vector velocity and vector acceleration of the device, wherein:

a center frequency of each of the one or more frequency bands corresponds to a wavelength $\lambda$, and a range between the transmitter and the receiver r is: $r < \lambda/2\pi$.

2. The method of claim 1, wherein the one or more transmitter axes are three orthogonal transmitter axes, the one or more receiver axes are three orthogonal receiver axes, and the one or more quasistatic magnetic field couplings are nine unique quasistatic magnetic field couplings.

3. The method of claim 1, wherein the center frequency of each of the one or more frequency bands is less than 500 kHz.

4. The method of claim 3, wherein the center frequency of each of the one or more frequency bands is greater than 5 kHz.

5. The method of claim 1, wherein each of the one or more frequency bands is less than 400 Hz.

6. The method of claim 5, wherein each of the one or more frequency bands is less than 100 Hz.

7. The method of claim 1, wherein the white noise is Gaussian additive noise.

8. The method of claim 7, wherein the filter is a Kalman digital filter.

9. The method of claim 1, wherein the filter is a mechanical filter, an electronic filter, an analog filter or a digital filter.

10. The method of claim 1, further comprising calculating a sum function by adding power measurements of all of the one or more quasistatic magnetic field couplings;

calculating a ratio function by taking a ratio between all of the power measurements of the one or more quasistatic magnetic field couplings; and inverting the sum function and the ratio function by a direct linear inversion calculation, wherein the drift-free orientation-invariant range between the transmitter and the receiver is calculated from the inverted sum function; and the one or more drift-free range-invariant orientation angles and the one or more drift-free range-invariant direction angles are calculated from the inverted ratio function.

11. The method of claim 10, wherein the drift-free position of the transmitter or of the receiver in the frame of reference is calculated based on the drift-free orientation-invariant range, on the one or more drift-free range-invariant orientation angles, and on the one or more drift-free range-invariant direction angles.

12. The method of claim 10, wherein the direct linear inversion calculation is an inverse cosine function of the ratio function.

13. The method of claim 1, wherein the drift-free position of the transmitter or of the receiver in the frame of reference is calculated based on the drift-free orientation-invariant range, on the one or more drift-free range-invariant orientation angles, and on the one or more drift-free range-invariant direction angles.

14. The method of claim 1, wherein the calculating vector velocity and vector acceleration of the transmitter or of the receiver comprises calculating a linear velocity by taking a derivative of the filtered drift-free position;

calculating a linear acceleration by taking a derivative of the linear velocity;

calculating an angular velocity by taking a derivative of the filtered drift-free orientation angles; and calculating an angular acceleration by taking a derivative of the angular velocity.

15. The method of claim 14, wherein the filter is a Kalman digital filter and wherein calculating the linear velocity, calculating the linear acceleration, calculating the angular velocity, and calculating the angular acceleration each comprise obtaining derivatives by Kalman state-space mechanics.

* * * * *